United States Patent
Ball (10) Patent No.: US 10,061,098 B2
(45) Date of Patent: Aug. 28, 2018

(54) LOW STRESS MOUNTING CONFIGURATION FOR OPTICAL COMPONENT

(71) Applicant: Qioptiq Limited, St. Asaph (GB)

(72) Inventor: Kenneth David Ball, Chester (GB)

(73) Assignee: Qioptiq Limited, St. Asaph (GB)

( * ) Notice: Subject to any disclaimer, the term of this patent is extended or adjusted under 35 U.S.C. 154(b) by 72 days.

(21) Appl. No.: 15/133,470

(22) Filed: Apr. 20, 2016

(65) Prior Publication Data

US 2016/0313530 A1 Oct. 27, 2016

(30) Foreign Application Priority Data

Apr. 21, 2015 (GB) .................................. 1506727.5

(51) Int. Cl.
  *G02B 7/00* (2006.01)
  *G02B 7/02* (2006.01)
  *F16B 11/00* (2006.01)

(52) U.S. Cl.
  CPC ............ *G02B 7/008* (2013.01); *F16B 11/006* (2013.01); *G02B 7/025* (2013.01); *G02B 7/026* (2013.01); *G02B 7/027* (2013.01); *G02B 7/028* (2013.01)

(58) Field of Classification Search
  CPC ........ G02B 7/022; G02B 7/025; G02B 7/026; G02B 7/027; G02B 7/028; G02B 7/008; F16B 11/006
  USPC ............... 359/811, 894, 813, 815, 819, 808; 156/293; 248/206.3
  See application file for complete search history.

(56) References Cited

U.S. PATENT DOCUMENTS

| 5,781,351 A | * | 7/1998 | Murakami | G02B 7/025 359/808 |
| 5,853,149 A | | 12/1998 | Vo et al. | |
| 7,265,916 B2 | * | 9/2007 | Kimura | G02B 13/001 359/811 |
| 7,362,519 B2 | * | 4/2008 | Sakaki | G02B 7/022 359/811 |

(Continued)

FOREIGN PATENT DOCUMENTS

| JP | 2005037444 A | 2/2005 |
| JP | 2008090290 A | 4/2008 |

OTHER PUBLICATIONS

GB Search Report for application GB1506727.5, dated Jul. 8, 2015.

(Continued)

*Primary Examiner* — Tan Le
(74) *Attorney, Agent, or Firm* — Peter A. Nieves; Sheehan Phinney Bass & Green PA (57) ABSTRACT

A system includes a dome-shaped optical component having a substantially circular edge and a mounting base for the optical component. A recess is in an outer surface of the optical component. A projection on an inner surface of the mounting base and is configured to engage the recess. An adhesive material is between the optical component and the mounting base. The adhesive material forms an upper band and a lower band with a void between the upper band and the lower band. The void is positioned relative to the recess in the outer surface of the optical component such that a bending stress in the optical component at the recess is less than what the bending stress would be without the void. A heater is inside and thermally coupled to the optical component.

25 Claims, 6 Drawing Sheets

(56) References Cited

U.S. PATENT DOCUMENTS

| | | | |
|---|---|---|---|
| 2007/0076309 A1* | 4/2007 | Shimizu | G02B 7/021 359/811 |
| 2012/0212843 A1* | 8/2012 | Lai | G02B 7/025 359/811 |
| 2014/0063632 A1 | 3/2014 | Jones et al. | |

OTHER PUBLICATIONS

Extended European Search Report for application EP16166340.6 dated Aug. 24, 2016.

\* cited by examiner

LOW STRESS MOUNTING CONFIGURATION FOR OPTICAL COMPONENT

CROSS-REFERENCE TO RELATED APPLICATION

This application claims priority to copending UK Application entitled "LOW STRESS MOUNTING CONFIGURATION FOR OPTICAL COMPONENT," having serial no. 1506727.5, filed Apr. 21, 2015, which is entirely incorporated herein by reference.

FIELD OF THE INVENTION

This application relates to a low stress mounting configuration and, more particularly, relates to systems and methods for low stress mounting of an optical component that may be, for example, substantially dome-shaped.

BACKGROUND

Mounting of substantially hemispherical optical domes can be difficult for a variety of reasons. One such reason is that there is minimal edge available for attachment to a surrounding structure. It may be possible to form an extension on such domes to assist with mounting, but manufacturing extensions like that can be difficult and/or expensive at least because of the complexity of the resulting geometry.

SUMMARY OF THE INVENTION

In one aspect, a system is disclosed that includes a dome-shaped optical component and a mounting base for the optical component. A recess is in an outer surface of the optical component. A projection is on an inner surface of the mounting base and is configured to engage the recess. An adhesive material is between the optical component and the mounting base. The adhesive material forms an upper band and a lower band with a void between the upper band and the lower band. The void is positioned relative to the recess in the outer surface of the optical component such that a bending stress in the optical component at the recess is less than what the bending stress would be without the void. A heater is thermally coupled to (and typically inside) the optical component.

In another aspect, a system is disclosed for mounting an optical component (e.g., a dome-shaped one) to a mounting base. The system includes a first retention mechanism configured to hold the optical component and the mounting base together; and a second retention mechanism configured to hold the optical component and the mounting base together. The first retention mechanism includes an adhesive material in a joint between the optical component and the mounting base. The adhesive material forms an upper band and a lower band with a void between the upper band and the lower band. In a typical implementation, the second mechanism includes a groove and projection.

In some implementations, one or more of the following advantages are present.

First, a highly reliable, positive, mounting system is provided for optical domes. Redundancy is provided by the use of multiple retention mechanisms in the mounting system. The high reliability is provided by including a particularly placed void in the adhesive material in the joint between the optical dome and the mounting base.

Various implementations of the mounting systems (and related techniques) disclosed herein can be implemented in a small envelope of space. They can seal the space inside the optical dome, which may contain environmentally sensitive electronic equipment, for example. They can accommodate thermal expansion mismatches (e.g., between the optical component and its mounting base). They can tolerate environmental loads that result from pressure, temperature, shock, wind, etc. They can tolerate and accommodate manufacturing process variability. They can minimize the effects of low strength in brittle optical surface features. They can be categorized as flight safe with adequate safety margins for a variety of applications. Finally, various implementations of the mounting systems (and related techniques) disclosed herein provide for de-icing.

In a typical implementation, the mounting systems (and related techniques) disclosed herein are easy to manufacture, cost effective and, provide for better reliability while using less adhesive material.

In a typical implementation, the configurations disclosed herein also provide sealing of the internal volume of an optical component from its surrounding environment.

Other features and advantages will be apparent from the description and drawings, and from the claims.

BRIEF DESCRIPTION OF THE DRAWINGS

Like reference characters refer to like elements.

DETAILED DESCRIPTION OF THE DRAWINGS

Figure 1:
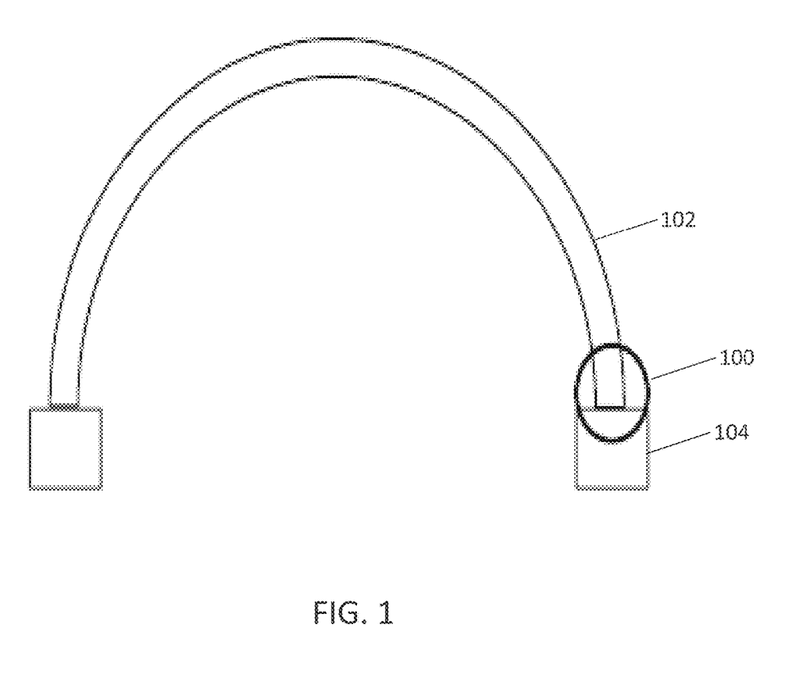
FIG. 1 is a schematic cross-sectional view of a substantially dome-shaped optical component coupled to a substantially annular mounting base.

FIG. 1 is a schematic cross-sectional view of a substantially dome-shaped optical component 102 with a substantially circular bottom edge coupled to a substantially annular mounting base 104. The substantially dome-shaped optical component 102 has a hemispherical outer convex surface, a hemispherical inner concave surface and a substantially circular edge at its lower periphery. The mounting base 104 is generally configured to mate with the lower portion of the optical component 102.

In a typical implementation, the illustrated assembly (102, 104 and 100) would be coupled to a separate mounting surface (not shown in FIG. 1), such as the outside of an aircraft. More particularly, in this type of implementation, the mounting base 104 would be secured to the mounting surface and the optical component 102 would be mounted to the mounting base 104.

A mounting system 100, represented schematically in the circle in FIG. 1, is provided at the interface of the optical component 102 and the mounting base 104 and holds the optical component 102 on the mounting base 104.

Figure 2:
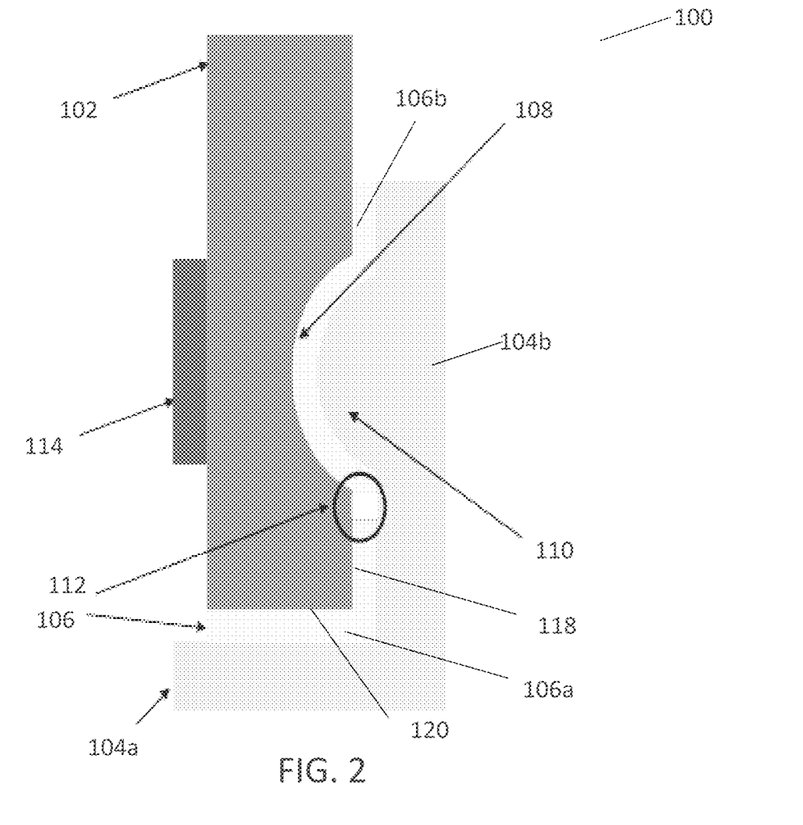
FIG. 2 is a more detailed schematic, partial, cross-sectional view of the mounting system represented in FIG. 1.

FIG. 2 shows a more detailed schematic, cross-sectional representation of the mounting system 100 in FIG. 1.

The illustrated mounting system 100 includes two substantially independent retention mechanisms, each of which acts to hold the optical component 102 and the mounting base 104 together. The first retention mechanism is an adhesive material 106 in the joint between the optical component 102 and the mounting base 104. The second retention mechanism is a recess 108 (on the optical component) and corresponding projection 110 (on the mounting base) at the joint between the optical component 102 and the mounting base 104. The recess 108 and projection 110 are configured to positively engage one another.

The adhesive material 106 in the joint between the optical component 102 and the mounting base 104 forms an upper band 106b and a lower band 106a, with a void 112 between the upper band and the lower band. In the illustrated implementation, the void 112 is essentially a space between the upper band 106b and the lower band 106a in which there is no adhesive material. As shown, the void 112 is positioned relative to the other mounting system components so as to reduce certain stresses in the other mounting system components. More particularly, and as discussed herein in some detail, the void 112 helps to reduce stress where the projection 110 engages the recess 108, helping to make the second retention mechanism (recess and projection) much less susceptible to failure than it otherwise would be.

The void 112, in the illustrated implementation, is located a short distance below the second retention mechanism (i.e., where the projection 106 mates with the recess 108). The upper band 106b of adhesive material extends from the very top of the joint, through the entire second retention mechanism, ending at the void 112 a short distance below the second retention mechanism. The lower band 106a of adhesive material extends from the void 112 vertically downward and then inward to an inner edge of the optical component 102 at the end of the joint. The size of the void 112 (i.e., the distance from the upper band 106b to the lower band 106a) can vary. However, in a typical implementation, that distance can be as small as 0.25 millimeters or as big as 2 millimeters, for example.

The adhesive material 106 can be any one of a variety of different types of adhesive material. In a typical implementation, the adhesive material 106 is a nearly incompressible adhesive, such as silicone. Generally speaking, nearly incompressible substances retain a nearly constant volume independent of pressure. Silicone is generally considered a good adhesive because its mechanical and thermal properties are generally quite insensitive to changes in temperature, and because it is able to cure at room temperature.

The mounting base 104, in the illustrated implementation, is substantially annular about a centrally disposed axis. As shown in FIG. 2, the mounting base 104 has a substantially L-shaped cross-section with a base portion 104a that is horizontally disposed and a wall portion 104b that extends vertically upward from an outer end of the base portion 104a.

The projection 110 is on an inner surface of the wall portion 104b of the mounting base 104. Moreover, in the illustrated implementation, the projection 110 is substantially convex in shape and is located approximately midway up the inner surface of the wall portion 104b. In a typical implementation, the projection 110 is substantially uniform in dimension relative to the inner surface of wall portion 104b around the entire perimeter of the mounting base 104. In a typical implementation, the projection 110 extends about 3 millimeters out from the inner surface of the wall portion 104b. However, this dimension can vary considerably. For example, in various implementations, the projection 110 can be anywhere from 1 millimeter to 4 millimeters.

The mounting base 104 can be made from any one of a variety of different materials or combinations thereof. In a typical implementation, the mounting base 104 is metallic.

The recess 108 is on an outer surface of the substantially circular edge region 118 of the optical component 102. Moreover, in the illustrated implementation, the recess 108 is substantially concave and extends inwardly from the outer surface of the substantially circular edge region 118. The recess 108 is a located on that outer surface at an elevation above the lower edge 120 of the optical component 102, such that, when the optical component 102 is coupled to the mounting base 104 as shown (i.e., with the lower edge 120 of the optical component adhered to and very near the upper surface of the base portion 104a of the mounting base), the recess 108 substantially aligns with the projection 110 on the mounting base 104.

In a typical implementation, the recess 108 is substantially uniform in dimension relative to the outer surface of the optical component in which it is formed around the entire perimeter of the optical component 102. Since the recess 108 and the projection 110 are intended to mate, as shown in the illustrated example, the recess 108 is sized so as to accommodate the projection 110. Thus, in some implementations, the recess 108 extends about 3 millimeter into the outer surface of the optical component 102. However, this dimension can vary considerably as well. For example, in various implementations, the recess 108 can be between 1 millimeter and 4 millimeters. The optical component 102 can be made from any one of a variety of different optical materials or combinations thereof. In a typical implementation, the optical component 102 is sapphire.

A heater 114 is thermally coupled to the optical component 102 and is operable to de-ice or prevent ice accumulation, particularly on the optical component. More particularly, in the illustrated implementation, the heater 114 is physically coupled to an inner surface of the optical component 102, very close to, but on an opposite side of wall portion 104b from the recess 108 in that wall portion 104b.

In a typical implementation, the material that forms the optical component 102 (e.g., sapphire or the like) has relatively low thermal conductivity. As such, during operation, the heater 114, in order to effectively de-ice or prevent ice accumulation on the outer surface of the optical component 102, generates relatively large amounts of heat. The heater 114 in the illustrated implementation is an electrical heater. However, it is possible to use other heaters as well.

In a typical implementation, the recess 108 forms a relatively weak point in the optical component 102. There are at least a few reasons for this. First, the recess 108, particularly at its deepest point, is the thinnest part of optical component 102. Second, almost invariably, the surface of a recess, such as the one shown in the illustrated example, is significantly rougher than the other, typically polished, surfaces of the optical component (e.g., the outer convex surface and the inner concave surface). This is due to processing limitations in forming the recess 108. Surface roughness can significantly reduce the strength of an optical component 102, particularly where the optical component 102 is a brittle material, such as sapphire or the like. Third, the heater 114, which is used for de-icing and the like, is positioned very close to the recess 108 and, therefore, induces thermal stresses at the recess 108 that tend to further compromise the structural integrity of the optical component 102 at the recess 108. This can be even more problematic where the material optical component 102 has low thermal conductivity, such as is the case with sapphire. In those instances, in order to perform adequate de-icing, the heater 114 may need to output a very large amount of heat. Finally, certain optical component materials, such as sapphire or the like, have relatively weak crystal cleavage planes that may align with problematic stresses due to optical considerations. These crystal cleavage planes can further compromise the structural integrity of a mounting system.

Figure 3A:
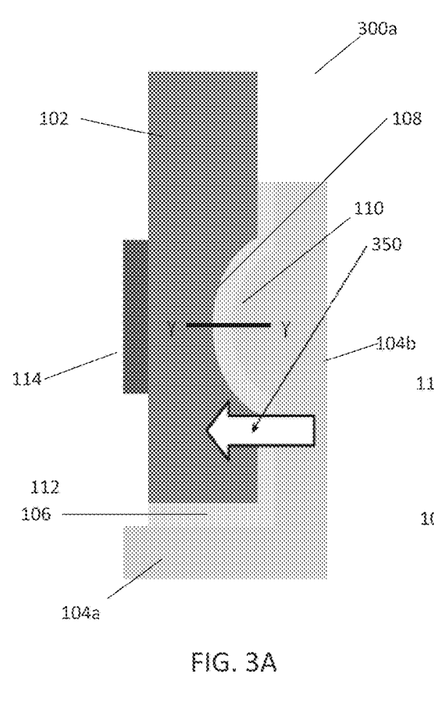
FIG. 3A is a schematic representation of resultant thermally induced bending force applied to an optical component in a mounting system with a single continuous strip of adhesive material.
Figure 3B:
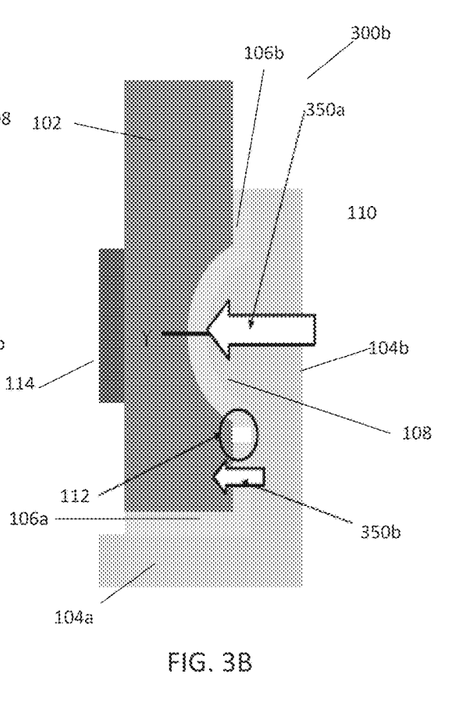
FIG. 3B is a schematic representation of resultant thermally induced bending forces applied to an optical component in a mounting system that has a void in the adhesive material.

FIGS. 3A and 3B show mounting systems 300a and 300b that, aside from the void 112, which is present in FIG. 3B but not present in FIG. 3A, are identical. Consideration of the forces at work in each of these arrangements illustrates some of the advantages of the void 112 in the arrangement of FIG. 3B.

Referring first to FIG. 3A, mounting system 300a has a single, unbroken strip of adhesive material 306 that extends from the very top of the joint between the optical component 102 and the mounting base 104 to the very bottom of the joint. In FIG. 3A, a section of the optical component 102 marked with a line, labeled "Y," is the section of the optical component 102 that is generally most susceptible to fracturing under stress. As discussed elsewhere herein, this high susceptibility is due to a variety of factors including recess depth at that point, surface roughness, material brittleness, and thermal stresses from operation of the heater 114.

In general, and particularly in temperature change conditions, when the optical component 102 is coupled to the mounting base 104, the mounting base 104 applies force against the optical component 102. The resultant force applied by the mounting base 104 against the optical component 102 is represented by arrow 350. In the illustrated example, this resultant force (arrow 350) is a single force obtained by combining all of the forces and bending moments acting on the optical component 102. Moreover, the point of application of the resultant force determines its associated bending moment induced stresses in the optical component 102.

In the illustrated implementation, the size of the arrow 350 corresponds to the magnitude of the resultant force and the location of the arrow 350 corresponds to the point of application of the resultant force. The magnitude of the applied force represented by arrow 350 is relatively large and the location of the arrow shows that the moment arm of the resultant force relative to the critical section Y (i.e., the distance from line Y to arrow 350) is quite large. Notably, the near incompressible nature of the adhesive material in the joint incurs significant resistance forces from the mounting base 104 to the optical component 102.

Thus, in the arrangement shown in FIG. 3A, the critical (and most susceptible to fracturing) section Y of the optical component 102 is exposed to very high bending stress.

Mounting system 300b, on the other hand, has an upper band 106b of adhesive material and a lower band 106a of adhesive material in the joint between the optical component 102 and the mounting base 104, with a void 112 between the upper band and the lower band. Indeed, mounting system 300b is virtually identical to mounting system 100 in FIG. 1.

Introducing the void 112 and thereby separating the adhesive material into an upper band 106b and a lower band 106a, as shown in FIG. 3B, separates the resultant force (350 in FIG. 3A) into two separate, smaller resultant forces (350a and 350b in FIG. 3B). It also ensures that the point of application of the larger of these two resultant forces (i.e., 350A) is closer to the critical section Y. Therefore, the larger of the two resultant forces 350A has a very short (if not non-existent) moment arm, and although the other resultant force 350B has a longer moment arm, that resultant force 350B is much smaller than 350A. The overall effect is the bending stress at the critical section Y from resultant force 350A and resultant force 350B is low.

Additionally, the void 112 provides a space into which the nearly incompressible adhesive 106a and 106b can expand under load. In a typical implementation, this can further relieve bending stress at the critical section Y.

In order to realize a reduction in bending stress at the critical section (e.g., "Y" in FIGS. 3A and 3B) of the optical component 102, it is important that the void 112 be located at an appropriate position within the joint to achieve that result.

Figures 4A, 4B:
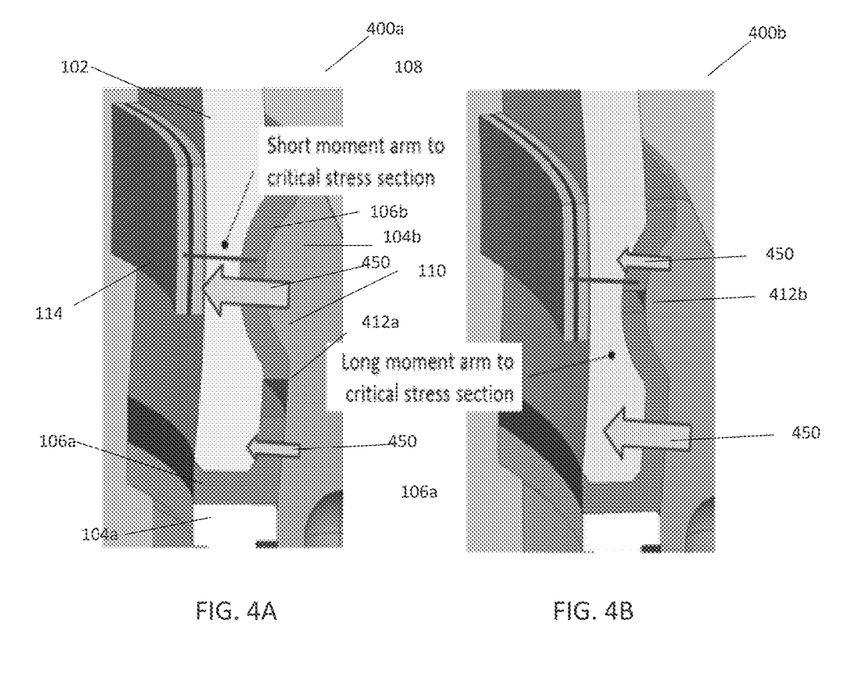
FIG. 4A is a schematic, partial, cross-sectional view showing resultant thermally induced bending forces applied to an optical component in a mounting system with a void in one position.
FIG. 4B is a schematic, partial, cross-sectional view showing resultant thermally induced bending forces applied to an optical component in a mounting system with a void in a different position than in FIG. 4A.

FIG. 4A and FIG. 4B show two examples of mounting systems 400a and 400b, both of which have voids 412a, 412b in the adhesive material. The resultant forces are shown as arrows 450 in FIGS. 4A and 4B, with the size of each arrow corresponding generally to the size of associated resultant force. The void 412a in FIG. 4A is positioned so as to reduce bending stress at the critical section (shown with a straight line in FIG. 4A). However, the void 412b in FIG. 4B does not reduce bending stress at the critical section (again, shown with a straight line in FIG. 4B). Instead, the void 412b in FIG. 4B increases bending stress at the critical location because it acts to increase the distance between the larger of the two resultant forces 450 and the critical section. Generally speaking, the void in the adhesive material should be located so that its presence decreases bending stress at the critical section (e.g., the recess of the optical component). For example, the void may be positioned as shown in FIG. 4A.

Figure 5:
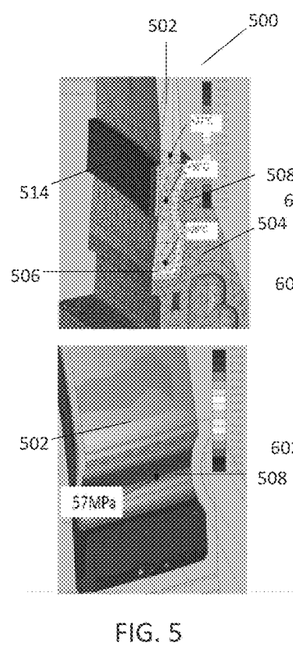
FIG. 5 has an upper drawing that shows a perspective, cross-sectional model of a mounting system with superimposed temperatures, and a bottom drawing that is a partial perspective model of the outer surface of the optical component in the mounting system with superimposed thermally induced stresses.
Figures 6, 7:
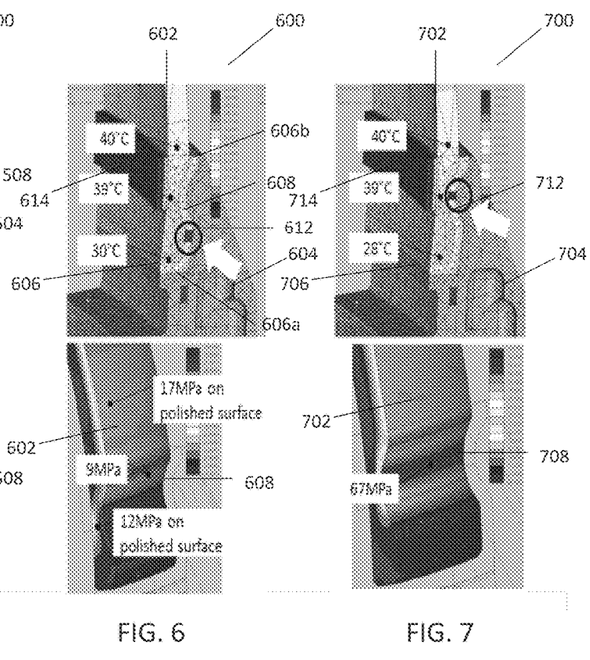
FIG. 6 has an upper drawing that shows a perspective, cross-sectional model of a mounting system with superimposed temperatures, and a bottom drawing that is a partial perspective model of the outer surface of the optical component in the mounting system with superimposed thermally induced stresses.
FIG. 7 has an upper drawing that shows a perspective, cross-sectional model of a mounting system with superimposed temperatures, and a bottom drawing that is a partial perspective model of the outer surface of the optical component in the mounting system with superimposed thermally induced stresses.

The modeling data provided in FIGS. 5 to 7 further emphasizes the importance of correct placement of the void.

The upper drawing in FIG. 5 shows a perspective cross-sectional model of a mounting system 500 between an optical component 502 and a mounting base 504 with superimposed typical temperatures. The bottom drawing in FIG. 5 is a partial perspective model of the outer surface of the optical component 502 in that mounting system 500 at the recess 508, with superimposed thermal stresses. In the illustrated example, the adhesive material 506 extends from the very top of the joint between the optical component 502 and the mounting base 104 all the way to the bottom of the joint, with no void, substantially uninterrupted.

The heater 514 in FIG. 5 is operational and the optical component 502 is 26 degrees Celsius near its bottom edge, 36 degrees Celsius near the deepest part of the recess 508 and 37 degrees Celsius just above the joint. The lower drawing in FIG. 5 shows that the recess is exposed to 57 MPa. This, of course, represents only one example of many possible load cases and is provided here primarily for comparison purpose to other stress profiles, such as those represented and described in connection with FIGS. 6 and 7, below.

FIG. 6 is similar to FIG. 5 in that it includes an upper drawing with a perspective cross-sectional model of a mounting system 600 between an optical component 602 and a mounting base 604 with superimposed typical temperatures and a bottom drawing with a partial perspective model of the outer surface of the optical component 602 in that mounting system 600 at the recess 608, with superimposed thermal stresses. In the example in FIG. 6, the adhesive material 606 in the joint between the optical component 602 and the mounting base 604 forms an upper band 606 band a lower band 606a with a void 612 between the upper band and the lower band.

Moreover, in the illustrated example, the void 612 is positioned in the joint relative to the projection/recess such that bending stress in the optical component 602 at the projection/recess is less than what the bending stress in the optical component at the projection/recess would be without the void 612. More particularly, the void 612, in the illustrated example, is between the recess/projection and a lower edge of the optical component 602.

The lower drawing in FIG. 6 shows that the recess is exposed to 9 MPa. This is significantly lower than the 57 MPa in the embodiment of FIG. 5 (where there is no void). This, of course, represents only one exemplary load case.

In the illustrated example, the heater 614 is operational and the optical component 602 is 30 degrees Celsius near its bottom edge, 39 degrees Celsius near the deepest part of the recess 608 and 40 degrees Celsius just above the joint. This information confirms that there is insignificant impact on the temperatures due to the insertion of the void. This, of course, represents only one example of many possible load cases.

FIG. 7 is similar to FIG. 6 in that it includes an upper drawing with a perspective cross-sectional model of a mounting system 700 between an optical component 702 and a mounting base 704 with superimposed typical temperatures and a bottom drawing with a partial perspective model of the outer surface of the optical component 702 in that mounting system 700 at the recess 708, with superimposed thermal stresses. In the example in FIG. 7, however, the void 712 is not positioned relative to the projection/recess such that the bending stress in the optical component 702 at the projection/recess is less than what the bending stress in the optical component at the projection/recess would be without the void 712. Instead, in the illustrated example, the void 712, which is in the recess/projection interface actually increases the bending stress in the optical component 702 at the recess/projection.

In this regard, the lower drawing in FIG. 7 shows that the optical component 702 at the recess is exposed to 67 MPa. This is significantly larger than the FIG. 6 embodiment (where, because of the void, the optical component is exposed to only 9 MPa at the recess) and is larger than the FIG. 5 embodiment (where there is no void and the optical component is exposed to 57 MPa at the recess). This, of course, represents only one example of many possible load cases.

In the illustrated example, the heater 714 is operational and the optical component 702 is 28 degrees Celsius near its bottom edge, 39 degrees Celsius near the deepest part of the recess 712 and 40 degrees Celsius just above the joint. This information confirms that there is insignificant impact on the temperatures due to the insertion of the void. Also, this represents only one example of many possible load cases.

Figure 8:
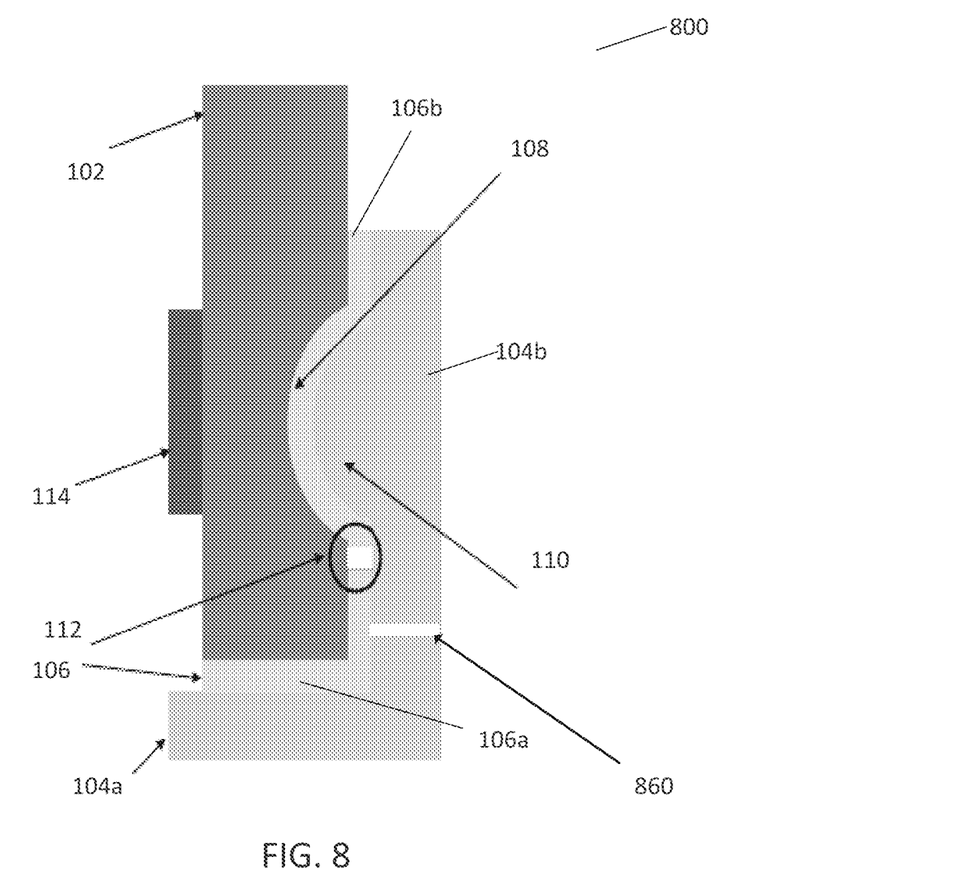
FIG. 8 is a detailed schematic, partial, cross-sectional view of a mounting system.

FIG. 8 shows a mounting system 800 similar to the mounting system in FIG. 2. However, the mounting system 800 in FIG. 8 has a hole 860 that extends through the mounting base 860. This hole 860 allows for the adhesive material 106 (at least the lower band 106b of adhesive material) to be injected into the joint (i.e., the space between the optical component 102 and the mounting base 104). In some implementations, an additional, similar hole may be provided for injecting the adhesive material (to form the upper band 106b) into the joint. However, in some implementations, the upper band 106b is formed by injecting the adhesive material into the upper end of the joint. Of course, in some implementations, the adhesive material (the upper band 106b, the lower band 106a, or both) can be applied to either the optical component 102 or the mounting base 104 before the optical component 102 and mounting base 104 are connected to each other. In a typical implementation, the mounting base 104 includes holes for injecting adhesive material spaced apart around the entire perimeter of the mounting base 104.

A number of embodiments of the invention have been described. Nevertheless, it will be understood that various modifications may be made without departing from the spirit and scope of the invention.

For example, the implementations described herein include two retention mechanisms (e.g., an adhesive material and a mating recess/projection). However, in some implementations, additional retention mechanisms could be added to the two retention mechanisms described herein.

Additionally, the size and/or shape of the recess and projection can vary considerably. The recesses described herein are essentially concave and dome-shaped. The projections described herein are essentially convex and dome-shaped. However, the recesses and projections can be rectangular, triangular or any other shape, although implications on such shapes on stresses would need to be considered separately.

The adhesive material can be virtually any kind of adhesive material. In most implementations, the adhesive material will be a nearly incompressible material. Moreover, the adhesive material need not extend all the way to the ends of the joint. In some instances, the adhesive material only fills part of the joint (with a void in the middle) and does not extend to the ends of the joint as described and shown elsewhere herein. In a typical implementation, the void in the adhesive material extends around an entire perimeter of the joint between the optical component and the mounting base. However, in some implementations, the void may extend around only parts of the perimeter of the joint between the optical component and the mounting base.

The heater can be any kind of heating element. In a typical implementation, the heater will be an electrical heater. However, the heater also could utilize other types of heating technology. In implementations that include a heater, the heater can be in direct physical contact with the optical component or not. As long as the heater is in thermal contact with the optical component, that should suffice. So, the heater may be near, but not touching, the optical component. Alternatively, there may be a thermally conductive interface (e.g., an adhesive or the like) between the heater and the internal surface of the optical component. In some implementations, the heater may even be in physical contact with or physically close to parts of the optical component other than the inner surface (e.g., the substantially circular lower edge of the optical component, or the outer surface of the optical component).

Relative terminology is used throughout this document. It should be understood that the relative terminology used herein, such as "upper", "lower", "above", "below", "front", "rear," etc. is solely for the purposes of clarity and is not intended to limit the scope of what is described here to require particular positions and/or orientations. Accordingly, such relative terminology should not be construed to limit the scope of the present application.

Additionally, the term substantially, and similar words, such as substantial, are used herein. Unless otherwise indicated, substantially, and similar words, should be construed broadly to mean to a great or significant extent. Moreover, substantially, unless otherwise apparent, should be understood to mean completely or entirely. For a measurable quantity substantially may mean 99% or more, 95% or more, 90% or more, 85% or more). For non-measurable quantities (e.g., an edge that is substantially circular), substantially should be understood to mean to a great or significant extent or completely or entirely.

A wide variety of materials and/or combinations of materials can be used for the optical component, the mounting base, the heater, the adhesive material, etc.

In some implementations, more than one void can be provided in the adhesive material. For example, some implementations could include adhesive material in the joint between the optical component and the mounting base forming an upper band, a middle band, and a lower band. In those implementations, there would be a first void between the upper band and the middle band and a second void between the middle band and the lower band. Two (or more) voids could be arranged in the joint such that bending stress in the optical component at the second retention mechanism (e.g., at a recess in a recess/projection interface) is less than what the bending stress in the optical component at the second retention mechanism would be without the two voids.

The optical component is generally described herein as being in the form of a hemispherical dome. However, the optical component could take alternative forms. For example, the optical component could instead take the form of an aspheric dome, or even a cylindrical component. It is proposed, however, that whatever the form of the optical component, it will have a substantially circular edge region terminating in a substantially circular edge in a similar manner to the dome described herein.

The mounting base can have a number of different possible configurations. In one such configuration, which is generally described herein, the mounting base has a base portion that is horizontally disposed and a wall portion that extends vertically upward from an outer end of the base portion. In this configuration, this mounting base is made up of three components—the base portion (being a flat planar ring) and a cylinder (which has the projection (i.e., retention bulge) that is split in half (and, therefore, two separate components) to facilitate assembly.

In some implementations, the mounting base has holes spaced around its perimeter, through which the adhesive material can be injected to form the upper band and the lower band, each of which may or may not be continuous around the perimeter of the joint.

The void in the adhesive material may be a literal gap (e.g., with nothing but air in it), or may be filled with any suitable material/medium that provides flexibility needed to permit the adhesive to expand with sufficient freedom to reduce the stresses in a similar manner to that of a void. In a typical implementation, the void provides a space for the adhesive to expand in and out of.

The substantially dome-shaped optical component shown, for example, in FIG. 1 was described above as having a hemispherical outer convex surface and a hemispherical inner concave surface. Of course, the inner and outer surfaces of the optical component do not have to be hemispherical. Moreover, the optical component itself can have any one of a variety of different shapes.

Relative sizes and positions and exact configurations of the components can vary considerably.

Other implementations are within the scope of the claims.

What is claimed is:

1. A system for mounting an optical component to a mounting base, the system comprising:
    a first retention mechanism configured to hold the optical component and the mounting base together; and
    a second retention mechanism configured to hold the optical component and the mounting base together, wherein the second retention mechanism comprises:
        a projection in a first one of the optical component or mounting base; and
        a recess in a second one of the optical component and the mounting base,
        wherein the projection is configured to engage the recess,
    wherein the first retention mechanism comprises an adhesive material in a joint extending around a perimeter between the optical component and the mounting base, and wherein the adhesive material forms an upper band and a base band with a void at least partially extending around the perimeter between the upper band and the base band, and wherein the perimeter comprises a substantially circular edge region of the optical component,
    wherein the upper band of adhesive material extends from a first end of the joint, through a portion of the joint where the projection engages the recess, and to a first end of the void, and
    wherein the base band of adhesive material extends from a second end of the void to a second end of the joint.

2. The system of claim 1, wherein the void is positioned in the joint relative to the second retention mechanism such that a bending stress in the optical component at the second retention mechanism is less than what the bending stress in the optical component at the second retention mechanism would be without the void.

3. The system of claim 1, wherein the recess is in the optical component, and wherein the void is positioned in the joint relative to the recess such that a bending stress in the optical component at the recess is less than what the bending stress in the optical component at the recess would be without the void.

4. The system of claim 1, wherein a distance from the first end of the void to the second end of the void is between 0.25 millimeters and 2 millimeters.

5. The system of claim 1, wherein the upper band of adhesive material is substantially uniform about an entire periphery of the joint, wherein the base band of adhesive material is substantially uniform about the entire periphery of the joint, and wherein the void is substantially uniform about the entire periphery of the joint.

6. The system of claim 5, wherein the projection and the recess are each substantially uniform about the entire periphery of the joint.

7. The system of claim 1, wherein the mounting base comprises:
    an annular base portion; and
    a cylindrical wall portion that extends from an outer end of the base portion substantially perpendicularly to the base portion,
    wherein the wall portion is configured to extend up an outer surface of the optical component.

8. The system of claim 7, wherein a heater is inside and thermally coupled to the optical component.

9. The system of claim 8, wherein the wall portion of the mounting base extends up the outer surface of the optical component a distance which will not obstruct any electromagnetic radiation passing through the optical component.

10. The system of claim 1, wherein the optical component is substantially dome-shaped.

11. The system of claim 1, wherein the optical component is sapphire and the mounting base is metallic.

12. The system of claim 1, wherein the adhesive material is, or is near to, an incompressible adhesive.

13. The system of claim 1, wherein the adhesive material in the joint between the optical component and the mounting base forms a middle band, wherein the upper band is separated from the middle band by a first void and wherein the middle band is separated from the base band by a second void.

14. A system comprising:
    an optical component having a substantially circular edge;
    a mounting base for the optical component;
    a recess in an outer surface of the optical component;
    a projection on an inner surface of the mounting base, wherein the projection is configured to engage the recess;
    an adhesive material between the optical component and the mounting base, wherein the adhesive material forms an upper band and a base band with a void between the upper band and the base band, and
    wherein the void is positioned relative to the recess in the outer surface of the optical component such that a bending stress in the optical component at the recess is less than what the bending stress would be without the void; and
    a heater inside and thermally coupled to the optical component.

15. The system of claim 14, wherein the upper band of adhesive material extends through where the projection engages the recess and to a first end of the void, and
    wherein the base band of adhesive material extends from a second end of the void.

16. The system of claim 14, wherein the optical component is substantially dome-shaped.

17. The system of claim 14, wherein the optical component is sapphire, wherein the mounting base is metallic, and wherein the adhesive material is a nearly incompressible adhesive.

18. A method comprising:
    providing an optical component having a substantially circular edge and a recess in an outer surface of the optical component;
    providing a mounting base for the optical component, wherein the mounting base has a projection on an inner surface, and wherein the projection is configured to engage the recess to hold the optical component and the mounting base together;
    attaching the optical component to the mounting base; and
    providing an adhesive material between the optical component and the mounting base, wherein the adhesive material forms an upper band and a base band with a void between the upper band and the base band,
    wherein the void is positioned relative to the recess in the outer surface of the optical component such that a bending stress in the optical component at the recess is less than what the bending stress would be without the void,
    wherein the upper band of adhesive material extends through where the projection engages the recess and to a first end of the void, and
    wherein the base band of adhesive material extends from a second end of the void.

19. The method of claim 18, further comprising:
    providing a heater inside and thermally coupled to the optical component.

20. The method of claim 18, wherein attaching the optical component to the mounting base comprises causing the projection to engage the recess.

21. The method of claim 18, wherein the mounting base mounting base comprises a base portion and a cylinder having a first cylinder portion and a second cylinder portion, and wherein attaching the optical component to the mounting base comprises connecting the first cylinder portion and the second cylinder portion to the base portion so that the projection engages the recess.

22. The method of claim 18, wherein providing the adhesive material comprising introducing the adhesive material through one or more holes in the mounting base.

23. A system for mounting an optical component to a mounting base, the system comprising:
    a first retention mechanism configured to hold the optical component and the mounting base together; and
    a second retention mechanism configured to hold the optical component and the mounting base together, wherein the second retention mechanism comprises:
        a projection in a first one of the optical component or mounting base; and
        a recess in a second one of the optical component and the mounting base,
        wherein the projection is configured to engage the recess,
    wherein the first retention mechanism comprises an adhesive material in a joint extending around a perimeter between the optical component and the mounting base, and wherein the adhesive material forms an upper band and a base band with a void at least partially extending around the perimeter between the upper band and the base band, and wherein the perimeter comprises a substantially circular edge region of the optical component,
    wherein the mounting base comprises:
        an annular base portion, and
        a cylindrical wall portion that extends from an outer end of the base portion substantially perpendicularly to the base portion,
        wherein the cylindrical wall portion is configured to extend up an outer surface of the optical component, and wherein a heater is inside and thermally coupled to the optical component.

24. The system of claim 23, wherein the cylindrical wall portion of the mounting base extends up the outer surface of the optical component a distance which will not obstruct any electromagnetic radiation passing through the optical component.

25. A method comprising:
providing an optical component having a substantially circular edge and a recess in an outer surface of the optical component;
providing a mounting base for the optical component, wherein the mounting base has a projection on an inner surface, and wherein the projection is configured to engage the recess to hold the optical component and the mounting base together;
attaching the optical component to the mounting base;
providing an adhesive material between the optical component and the mounting base, wherein the adhesive material forms an upper band and a base band with a void between the upper band and the base band, wherein the void is positioned relative to the recess in the outer surface of the optical component such that a bending stress in the optical component at the recess is less than what the bending stress would be without the void; and
providing a heater inside and thermally coupled to the optical component.

* * * * *